(12) United States Patent
Chimalapati et al.

(10) Patent No.: US 11,860,365 B2
(45) Date of Patent: Jan. 2, 2024

(54) MODELING THERMAL EFFECTS FOR A LASER SYSTEM

(71) Applicant: Microsoft Technology Licensing, LLC, Redmond, WA (US)

(72) Inventors: Harini Chimalapati, Bellevue, WA (US); Christopher Jon Johnson, Snoqualmie, WA (US); Jingyang Xue, Sunnyvale, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 17/221,528

(22) Filed: Apr. 2, 2021

(65) Prior Publication Data

US 2022/0317447 A1 Oct. 6, 2022

(51) Int. Cl.
*G02B 27/01* (2006.01)
*H01S 3/034* (2006.01)
*H01S 3/04* (2006.01)

(52) U.S. Cl.
CPC ........ *G02B 27/0172* (2013.01); *H01S 3/0346* (2013.01); *H01S 3/04* (2013.01); *G02B 2027/0178* (2013.01)

(58) Field of Classification Search
CPC ...... G02B 27/0172; H01S 3/0346; H01S 3/04
See application file for complete search history.

(56) References Cited

U.S. PATENT DOCUMENTS

| 8,605,764 | B1 | 12/2013 | Rothaar et al. |
| 10,536,217 | B2 * | 1/2020 | Ishizaka ................. H04B 10/58 |
| 11,594,852 | B2 * | 2/2023 | Barter ................ G02B 26/0833 |
| 2007/0160095 | A1 * | 7/2007 | Kitagawa .............. H01S 5/0683 |
| | | | 372/29.012 |

(Continued)

OTHER PUBLICATIONS

"Invitation To Pay Additional Fees Issued in PCT Application No. PCT/US22/020472", dated Jun. 24, 2022, 14 Pages.

(Continued)

*Primary Examiner* — Doon Y Chow
*Assistant Examiner* — Dennis Chow
(74) *Attorney, Agent, or Firm* — Ray Quinney & Nebeker; James Bullough

(57) ABSTRACT

The present disclosure relates to systems, methods, and computer readable media for modeling thermal effects within a multi-laser device. For example, systems described herein may include a plurality of laser devices that output energy streams having corresponding operating windows. One or more systems described herein may include a set of accumulators for tracking quantities of energy samples within operating windows and populating a queue representative of the tracked quantities. One or more systems described herein may additionally include filters and a summing module for determining temperature values for operating windows and synchronizing the temperature values with one another to determine an accurate system temperature for the multi-laser device. The features described herein facilitate synchronization of data for corresponding operating windows to provide an accurate deter- (Continued)

mination of system temperature based on a combination of self-heating and crosstalk effects between multiple laser devices.

20 Claims, 8 Drawing Sheets

(56) References Cited

U.S. PATENT DOCUMENTS

| | | | |
|---|---|---|---|
| 2009/0028199 A1* | 1/2009 | Brown | H01S 5/06804 |
| | | | 372/38.01 |
| 2018/0146176 A1 | 5/2018 | Orlick et al. | |
| 2020/0052464 A1 | 2/2020 | Champion et al. | |

OTHER PUBLICATIONS

"International Search Report and Written Opinion Issued in PCT Application No. PCT/US22/020472", dated Aug. 17, 2022, 22 Pages.

* cited by examiner

MODELING THERMAL EFFECTS FOR A LASER SYSTEM

BACKGROUND

Laser display systems, such as those that rely on microelectromechanical systems (MEMS) technology are becoming increasingly common in a variety of scanning and display applications. Indeed, MEMS devices are used in an increasing number of laser devices for enhancing display applications and improving performance specifications of a variety of computing devices. By way of example, laser display systems are used in a variety of scanning devices including high-frequency scanners, low-frequency scanners, linear and non-linear scanners, and two-dimensional scanners. Many of these laser systems incorporate electronic filters (e.g., infinite impulse response (IIR) filters) that facilitate modeling thermal effects for one or more laser devices that may be used in driving the laser devices themselves.

Conventional laser systems, however, suffer from a number of difficulties and drawbacks. For example, where a laser device is often programmable to generate an output in accordance with a timing window (e.g., an operating window), systems that include multiple lasers and/or multiple filters may experience difficulty in modeling thermal effects within the system where different laser devices operate in accordance with different and/or asynchronous timing intervals. In addition, where a display system includes multiple laser devices and/or multiple filters, modeling thermal effects can become difficult where thermal effects include a combination of both self-heating and crosstalk between devices.

Because conventional systems are often unable to accurately model thermal effects within a system (e.g., a multi-laser system), quality of laser-driven displays often suffers over time. For example, where a system fails to accurately account for heating effects within a multi-laser system, the hardware that drives the laser devices may fail to determine the correct current at which to drive the laser devices. Driving these laser devices at incorrect currents can cause inaccuracies in the displays themselves (e.g., inaccurate colors and/or intensities) and, in many cases, can cause device hardware to wear down more quickly over time.

These and other problems exist with regard to modeling thermal effects for laser systems including multiple devices and/or multiple filters.

DETAILED DESCRIPTION

Figure 1:
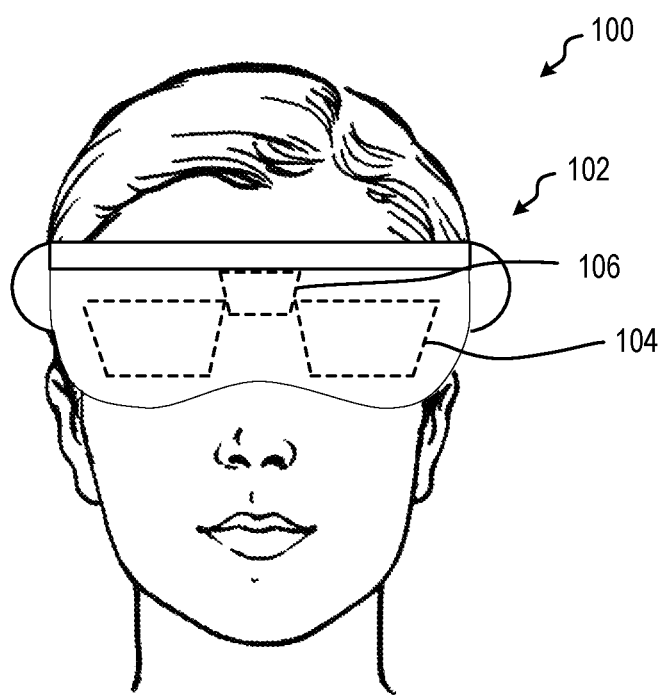
FIG. 1 illustrates a perspective view of a head-mounted display (HMD) including an example laser display system according to one or more embodiments.

The present disclosure is generally related to a laser display system (e.g., a single or multi-laser display system) that models thermal effects for a plurality of laser devices within the system based on a combination of self-heating effects and crosstalk between the laser devices. In particular, as will be discussed in further detail below, the laser display system provides features and functionality to determine temperature values for synchronized time windows based on diverse operating windows of the respective laser devices. For example, in one or more embodiments, the laser display system implements a summing module that communicates with various filters (e.g., IIR filters) in an effort to determine synchronized temperature values over a common window (e.g., a combined window inclusive of multiple operating windows) between a plurality of laser devices. In addition, or as an alternative, in one or more embodiments, the laser display system implements control and synchronization logic for populating synchronized queues of values for the plurality of laser devices. In each of these examples, the determined values and/or queues may be used to model system temperature(s) that accounts for a combination of self-heating effects and crosstalk between the set of laser devices. For example, the values and/or queues may be used to model a system temperature including junction temperatures for each laser in a laser display system. In one or more embodiments, the values and/or queues may be used to model a system temperature including a combination of multiple temperatures reflective of a temperature for a set of multiple laser devices.

As a first illustrative example, in one or more embodiments, the laser display system includes a set of lasers that output a plurality of output streams of energy samples in accordance with a set of operating windows having windows sizes that are multiples of a base window size. A set of filters may determine temperature values for the laser devices in accordance with instructions received from a summing module. In particular, the summing module and can identify a state of the filters and provide signals (e.g., ACK signals) to indicate when a filter should provide a temperature value to the summing module. As will be discussed in further detail below, the summing module provides features and functionality for synchronizing the temperature data to facilitate modeling a system temperature for the set of laser devices based on the compiled sets of laser temperatures over time.

As a second illustrative example, in one or more embodiments, the laser display system includes a set of lasers that output a plurality of output streams of energy samples in accordance with a set of operating windows having windows sizes that are multiples of a base window size. The laser display system may accumulate energy samples and determine discrete quantities of the energy samples over a set of base windows. The laser display system may additionally populate queues for the set of laser devices including indicated quantities of energy samples over the set of base windows to provide as input to a set of filters and the summing module. The laser display system may utilize the queues to facilitate modeling a system temperature for the set of laser devices.

As will be discussed in further detail below, the present disclosure includes a number of practical applications having features described herein that provide benefits and/or solve problems associated with modeling thermal effects of a set of laser devices within a laser display system. Some example benefits are discussed herein in connection with various features and functionalities provided by the laser display system. It will be appreciated that benefits explicitly discussed in connection with one or more embodiments described herein are provided by way of example and are not intended to be an exhaustive list of all possible benefits of the laser display system.

For example, as will be discussed in further detail below, the laser display system can synchronize data (e.g., energy samples, queues, temperature values) in such a way that improves upon conventional techniques for modeling thermal effects on the system. For instance, even where operating windows have different windows sizes and where the lasers may generate and output energy streams asynchronously, the systems described herein can synchronize data in a way that enables a thermal model to consider data generated over relevant windows for each of multiple laser devices. Indeed, by synchronizing data in accordance with one or more embodiments, the laser display system avoids problems associated with considering data generated and output over non-overlapping or otherwise asynchronous periods of time that may cause inaccuracies in attempting to determine thermal temperatures for the system.

In addition, as will be discussed in further detail below, the laser display system facilitates accurate thermal modeling by considering a combination of self-heating effects and crosstalk effects of a set of laser devices in modeling the thermal effects. Indeed, by effectively synchronizing the data over a set of base windows, the laser display system can accurately determine both self-heating as well as heating caused by one laser to one or more additional lasers. This provides a more accurate model of system temperature, which enables drivers of the lasers to determine an accurate electrical current to use in driving the respective laser devices. For example, in one or more embodiments, a system temperature is fed back to a laser driving circuit for use in determining currents with which to drive the laser device(s) within the laser display system. In one or more embodiments, a system temperature including junction temperature(s) for one or more laser devices is fed to the laser driving circuit or other control system for determining temperatures specific to the laser device(s) that may be used in updating current values being used to drive the laser device(s).

In addition, the laser display system provides the above benefits notwithstanding differences in operation of the respective laser devices. For example, even where one or more lasers output energy samples at much higher densities or with much higher intensity than other lasers, the system can nevertheless accurately determine the effect that each of the lasers have within the system. Moreover, by populating queues and accumulating temperature values in accordance with one or more embodiments described herein, the laser display system can provide the improved accuracy and performance of the laser display system without causing the filters, summing module, and/or accumulators to hold onto various data in a way that prevents other components of the laser display system from performing normal operations.

As illustrated in the foregoing discussion, the present disclosure utilizes a variety of terms to described features and advantages of the systems described herein. Additional detail is now provided regarding the meaning of some of these terms. For example, as used herein, a laser display system (e.g., a single or multi-laser display system) refers to a device including one or multiple laser devices that cooperatively provide scanning and/or display capabilities. Indeed, a laser display system may refer to any device that utilizes an array or a set of multiple lasers driven by one or more controllers or drivers and which operate in accordance with received instructions. In one or more embodiments, a laser display system refers to a single laser system having multiple filters. As will be discussed in further detail below, the set of multiple lasers may contribute to a system temperature for the laser display system based on self-heating effects for each of the laser devices as well as crosstalk effects caused as a result of laser devices impacting a temperature of other laser devices.

As mentioned above, and as will be discussed in further detail below, each of the laser devices may generate streams of energy samples. As used herein, "energy samples" may refer to a discrete unit of energy or an instance of light output by a laser device. For example, energy samples may refer to a set of samples that make up a laser event including any number of energy samples output over one or more operating windows. As will be discussed herein, energy samples may be output at a corresponding density with some laser devices outputting energy samples at a high density (e.g., a high number of energy samples over time), a low density (e.g., a low number of energy samples over time), or a variety of incremental densities. In addition, energy samples may have an intensity corresponding to a particular brightness, color, or other visual characteristic of the energy sample(s).

In one or more embodiments described herein, energy samples may be output in accordance with an operating window. As used herein, an "operating window" refers to a duration of time (e.g., a time window) over which energy samples will be processed for a corresponding laser device (or for a corresponding filter). For example, an operating window may refer to intervals of time over which energy samples output during a time interval are fed to a filter or other hardware for processing as a set of data (e.g., a set of energy samples or a set of values representative of the energy samples for a corresponding operating window). In one or more embodiments, an operating window refers to intervals of time over which energy samples are processed by different laser filters. In one or more embodiments, the operating window is a programmable window that has a specific size based on specifications of the laser device(s) and/or programmable instructions that determine how the laser device is to be used within the laser display system.

As used herein, a "base window" or "base window interval" may refer to an interval or duration of time that is a factor of each of multiple operating windows for a set of laser devices. For example, where a laser display system includes a first filter device having an operating window of size four (e.g., four time units), a second filter device having an operating window of size eight, and a third filter device having an operating window of size sixteen, a base window may refer to an interval of four, two, or one. In one or more embodiments, the base window may simply refer to a window size of two units (e.g., where each of the laser devices have programmable operating windows at powers of two units), or may be determined specifically based on a greatest common factor of the operating windows for the plurality of laser devices and/or filters. Additional details in connection with a base window will be discussed below in connection with example implementations of the laser display system.

As used herein, a "combined window" may refer to an interval or duration of time that is a multiple of operating windows for a set of laser devices. For example, where a laser display system includes a first filter device having an operating window of size four, a second filter device having an operating window of size eight, and a third filter device having an operating window of size sixteen, a combined window may refer to an interval of sixteen, thirty-two, or other common multiple of the operating windows for the set of laser devices. In one or more embodiments, the combined window refers to a set of base windows having a combined interval equal to the combined window size.

Additional detail will now be provided regarding a laser display system in relation to illustrative figures portraying example implementations. For example, FIG. 1 illustrates an example environment 100 including a head mounted display (HMD) 102 (or simply "HMD 102") worn by an individual user. As shown in FIG. 1, the HMD 102 includes a display device configured to display near-eye imagery to an individual. In one or more embodiments, the HMD 102 includes a display device 104 that presents a display to a user in accordance with application(s) of the HMD 102. For example, the display device 104 may be substantially opaque and present virtual imagery as part of a virtual-reality (VR) experience in which the wearer of the HMD 102 is immersed in the VR experience. Alternatively, the display device 104 may be partially transparent, allowing the user to view presented virtual imagery in combination with a real-world background to form an augmented reality (AR) or mixed-reality experience. The opacity and experience may adjust to facilitate different display applications using the same HMD 102.

As further shown in FIG. 1, the HMD 102 may include a computing device 106 to perform various computing functions, including generating virtual imagery or other visual content to be presented via the display device 104. The computing device 106 may implement a variety of hardware, software, firmware, or any combination thereon. Indeed, the computing device may implement an integrated logic device, such as a processor or storage subsystem. The computing device 106 may further include a non-transitory computer-readable storage medium including instructions thereon that implements various features and functionality described herein. The instructions may be organized into routines, programs, objects, components, data structures etc.

The HMD 102 may include various sensors to provide information to the computing device 106. Such sensors may include one or more inward facing image sensors (e.g., for eye tracking), one or more outward facing image sensors, an inertial measurement unit (IMU), and one or more microphones (e.g., for receiving voice commands). In one or more embodiments, the HMD 102 includes various sensors that provide information to the computing device 106.

In one or more embodiments, the computing device 106 includes a laser display system in accordance with one or more embodiments described herein. It will be understood that while one or more embodiments of the laser display system are described in connection with a system integrated within an HMD 102, other types of computing devices may be used. Indeed, any device having a set of multiple lasers for scanning and/or displaying content may implement features and functionalities described herein. Moreover, while one or more embodiments described herein refer specifically to modeling thermal effects within a MEMS laser system, the laser display system may be implemented within a variety of computing devices that utilize a variety of multi-laser configurations.

Figure 2:
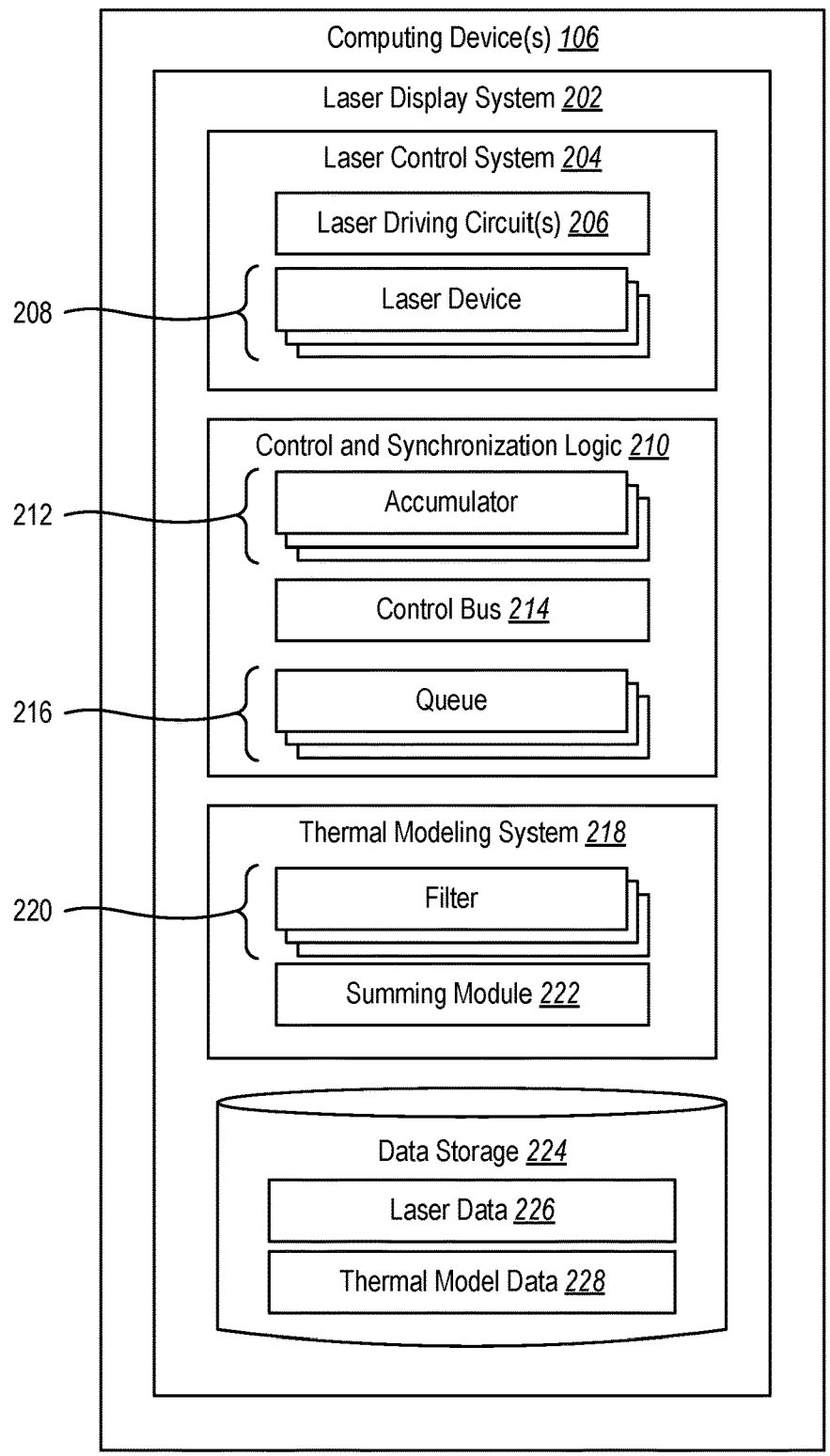
FIG. 2 illustrates an example block diagram of the laser display system in accordance with one or more embodiments.

FIG. 2 illustrates an example implementation of a laser display system (e.g., a multi-laser display system) implemented on a computing device (e.g., computing device 106). In particular, FIG. 2 illustrates an example implementation of the laser display system 202 including components that provide features and functionalities described herein. As shown in FIG. 2, the laser display system 202 may include a laser control system 204 having one or more laser driving circuit(s) 206 and a plurality of laser devices 208. As further shown, the laser display system 202 may include control and synchronization logic 210 including accumulators 212, a control bus 214, and queues 216. The laser display system 202 may additionally include a thermal modeling system 218 having a plurality filters 220 and a summing module 222. As further shown, the computing device 106 may include a data storage 224 including laser data 226, thermal model data 228, and any additional data thereon for use by any of the components 204-222 of the laser display system 202.

Additional information will now be discussed with respect to the components of the laser display system 202. In particular, as just mentioned, the laser display system 202 may include a laser control system 204 having a laser driving circuit 206 and laser devices 208 implemented thereon. In one or more embodiments, the laser display system 202 includes a single laser driving circuit 206 that drives a plurality of laser devices 208. Alternatively, in one or more embodiments, the laser driving circuit 206 includes a controller or control circuit for each of the plurality of laser devices 208.

As noted above, the laser driving circuit(s) 206 can drive each of the laser devices 208 in accordance with programmable instructions. For example, the laser driving circuit(s) 206 can drive the laser devices 208 to output energy samples having a particular density, intensity, and/or duration. The density, intensity, duration, or other characterization of the energy samples may be determined based on a particular function of the corresponding laser device(s) within the computing device 106. For example, the laser driving circuit(s) 206 can drive the laser device(s) 208 based on a particular routine to produce a display or to cooperatively perform a scanning function.

As will be discussed in further detail below, the laser driving circuit(s) 206 can drive each of the laser devices 208 in accordance with an operating window. In one or more embodiments, the laser devices 208 may be associated with operating windows having different sizes from one another. For example, a first laser may be associated with a first operating window of four units while a second laser device is associated with a second operating window of eight units. Other laser devices may have similar (e.g., identical) or different associated operating window sizes. It will be understood that while one or more embodiments described herein refer to laser devices having or otherwise being associated with corresponding operating windows, the operating windows may refer to constructions for modeling thermal effects within the laser display system 202.

As will also be discussed in further detail below, each of the operating windows may be multiples of a base window. For example, in one or more embodiments, the laser driving circuit(s) 206 is configured to drive the laser devices 208 at windows having a base of two units. Accordingly, in one or more embodiments, the base window has a size of two units.

In one or more embodiments, the base window size is determined based on a lowest common factor between the operating window sizes for the plurality of laser devices 208.

In one or more embodiments, the operating window sizes may be determined based on a particular application and/or based on a role of a particular laser device in producing a display or performing a scan. The operating window sizes may be particular to a specific laser device. In one or more embodiments, the operating window sizes are determined for a specific application (e.g., a software application). In this way, the laser devices 208 may have different sized operating windows depending on a particular application used by the laser display system 202.

In addition, as noted above, while the laser driving circuit(s) 206 may drive the laser devices 208 in accordance with specific operating window sizes, in one or more embodiments, the laser driving circuit(s) 206 does not necessarily run the laser devices 208 in lockstep with one another. For example, while the operating windows may be multiples of one another, the windows may be asynchronous and may not necessarily overlap in a synchronized manner. Accordingly, even where the operating windows may be multiples of a base window, the laser driving circuit(s) 206 may run the laser devices 208 in a way that base windows that make up the larger operating windows do not line up with one another. Indeed, as discussed above, this asynchronous alignment of the operating windows may cause significant problems in conventional systems that attempt to model thermal effects for a laser display system.

As shown in FIG. 2, the laser display system 202 additionally includes control and synchronization logic 210. The control and synchronization logic 210 may include accumulators 212. As will be discussed in further detail below, the accumulators 212 can receive and accumulate energy samples over operating windows of the respective laser devices 208. In particular, the accumulators 212 can collect energy samples over incremental base windows that combine to form the corresponding operating windows. In one or more embodiments, the accumulators 212 tracks and determines a number of energy samples within each base window of an operating window. The accumulators 212 can accumulate the energy samples for each of the laser devices 208. For example, in one or more embodiments, the accumulators 212 include an accumulator for each laser device of the laser display system 202.

As further shown in FIG. 2, the control and synchronization logic 210 includes a control bus 214. In one or more embodiments, the control bus 214 provides a communication medium by which the accumulators 212 can communicate with one another. For example, in one or more embodiments, each accumulator can broadcast a status to each of the additional accumulators within a set of accumulators 212 coupled to the laser devices 208. This may involve communicating whether an accumulator has received any energy samples within a base window and/or operating window. Additional information in connection with an example implementation of the accumulators 212 and the control bus 214 will be discussed in further detail below.

As noted above, the control and synchronization logic 210 may additionally include a plurality of queues 216 to be populated by the accumulators 212. For example, the accumulators 212 may populate a plurality of queues including a set of values representative of quantities of energy samples tracked or otherwise observed by the accumulators within a corresponding operating window. In one or more embodiments, the accumulators 212 populate the queues 216 to include entries identifying a quantity of energy samples for each base window of a combined window representative of a common multiple for each of the operating windows. Additional information will be discussed below in connection with an example implementation shown in FIG. 4.

As shown in FIG. 2, the laser display system 202 additionally includes a thermal modeling system 218. As will be discussed in further detail below, the thermal modeling system 218 may provide features and functionality related to determining temperature values for the respective laser devices 208. The thermal modeling system 218 may additionally determine a system temperature based on a combination of temperature values. In one or more embodiments, the thermal modeling system 218 makes use of a thermal model that considers a combination of self-heating effects and crosstalk effects between the laser devices 208. As noted above, in one or more embodiments, the system temperature may include a junction temperature for each laser in the laser display system 202.

As shown in FIG. 2, the thermal modeling system 218 includes a set of filters 220. In one or more embodiments, the thermal modeling system 218 includes a filter for each laser device. Alternatively, the thermal modeling system 218 may include multiple filters for corresponding laser devices. In one or more embodiments, the thermal modeling system 218 includes a single component including circuitry for filtering any number of inputs originating from the laser devices 208. In one or more embodiments, the thermal modeling system 218 includes filters 220 where each filter can represent a different time constant for either self-heating or crosstalk thermal effects. As will be discussed below, the filters 220 may include circuitry for determining a temperature for each laser. In one or more embodiments, the filters 220 determine temperature values for one or more operating windows. In one or more embodiments, the filters 220 determine one or more temperature values for a combined window. As discussed above, the combined window may span over multiple operating windows. Indeed, as discussed in connection with one or more embodiments herein, the combined window may include a plurality of base windows that make up the combined window. In one or more embodiments, the filters 220 refer specifically to IIR filters or other digital signal processor (DSP) filters.

As further shown, the thermal modeling system 218 may include a summing module 222. In one or more embodiments, the summing module 222 provides features related to combining temperature values determined by the filters 220 and applying a thermal model to the temperature values to model a system temperature for the laser display system 202. For example, the summing module 222 may apply a thermal model including one or more algorithms and/or machine learning model(s) to temperature values to determine a system temperature. As noted above, the system temperature(s) may be based on a combination of temperature values for respective laser devices, which may include both self-heating effects from the respective lasers as well as crosstalk thermal effects from lasers acting on one another within the system.

It will be noted that while FIG. 2 illustrates an example laser display system 202 showing both control and synchronization logic 210 a thermal modeling system 218 within a single implementation, one or more embodiments of the laser display system 202 may include only a portion of the components described herein (e.g., as illustrated in FIG. 2). For example, in one or more embodiments, the laser display system 202 includes control and synchronization logic 210 including accumulators 212 for populating synchronized queues 216 that may be used to determine system temperatures. In particular, the queues 216 may include intermediate data that may be used by the filters 220 to determine system temperatures. In this example, one or more features of the summing module 222 may be modified over one or more other implementations described herein.

Alternatively, in one or more embodiments, acts related to synchronizing various values (e.g., temperature values) may be performed on a back end of a workflow in which temperature values are determines asynchronously by the filters 220 and provided to a summing module 222. In particular, as will be discussed in further detail below, the summing module 222 can generate and communicate instructions with the filters 220 to wait and transmit temperature values in a synchronized manner with other filters 220 within the laser display system 202. In this example, some of the features described in connection with the control and synchronization logic 210 may be excluded from the laser display system 202 and performed by the summing module 222.

As further shown, the laser display system 202 may include a data storage 224 including various types of data. For example, the data storage 224 may include laser data 226. The laser data 226 may include any data associated with each of the multiple laser devices 208. For example, the laser data 226 may include hardware specifications for the respective laser devices 208. The laser data 226 may include indications of operating window sizes for the laser devices 208. The laser data 226 may additionally include frequency data, intensity data, or any other information about characteristics of the respective laser devices 208 that may be used by any of the components 204-222 of the laser display system 202 in determining quantities and characteristics of energy samples and determining a system temperature.

As further shown, the data storage 224 may include thermal model data 228. The thermal model data 228 may include any information associated with heating characteristics of the respective laser devices 208 and system generally. For example, the thermal model data 228 may include one or more algorithms used in determining the system temperature based on temperature values generated by the filters 220. In one or more embodiments, the thermal model data 228 includes a model, such as a machine learning model trained to determine a system temperature. Indeed, the thermal model data 228 may include any data used by the summing module 222 (or other components of the laser display system 202) to determine temperature of the system and/or of the respective laser devices 208.

Figure 3:
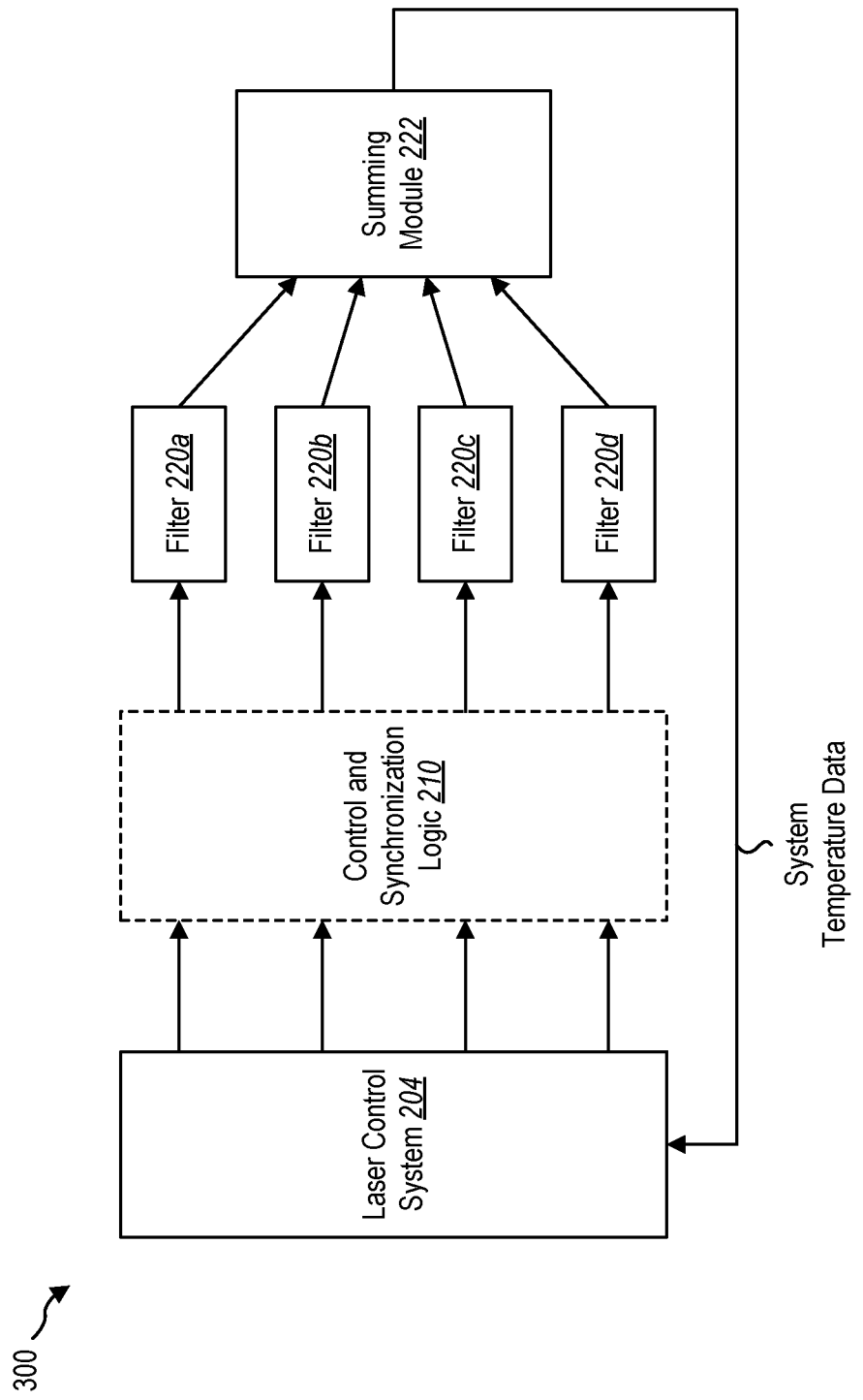
FIG. 3 illustrates an example workflow showing an example implementation of the laser display system described in FIG. 2.

FIG. 3 illustrates an example workflow 300 showing select components 204-222 of the laser display system 202 in accordance with one or more embodiments. In particular, FIG. 3 illustrates a workflow 300 showing an example implementation in which a laser driving circuit(s) 206 provides instructions to a set of laser devices 208a-d to generate and output energy samples in accordance with respective energy windows. As shown in FIG. 3, the laser display system 202 includes four laser devices 208a-d receiving instructions from a laser driving circuit 206. In one or more embodiments, each of the laser devices 208a-d receives instructions from a respective laser driving circuit. Moreover, in one or more embodiments, the laser display system 202 includes additional or fewer than four laser devices 208a-d as shown in the illustrated example.

In one or more embodiments, the laser devices 208a-d provide streams of energy samples to control and synchronization logic 210 configured to identify quantities of energy samples within base windows across the laser devices 208a-d and populate queues for each of the laser devices 208a-d. As will be discussed in further detail below, the control and synchronization logic 210 may include accumulators 212, a control bus 214, and queues 216. In one or more embodiments, the laser display system 202 may omit the control and synchronization logic and implement various synchronization features within the summing module 222. Examples of each of these implementations will be discussed in further detail below.

As shown in FIG. 3, the laser display system 202 additionally includes a set of filters 220a-d. In one or more embodiments, the filters 220a-d refer to IIR or other DSP filters. In addition, the filters 220a-d may include a respective filter for each of the laser devices 208a-d. In one or more embodiments described herein, the filters 220a-d may receive energy samples (or indicated sums of energy samples) and determine a temperature value associated with a corresponding laser device 208a-d. As will be discussed in further detail below, the filters 220a-d can provide the temperature values to the summing module 222 for further processing.

The summing module 222 may combine values received from the filters 220a-d to determine a system temperature for the laser display system 202. For example, in one or more embodiments, the summing module 222 receives temperature values based on energy samples that have been accumulated for corresponding base windows and determines a system temperature based on the combination of temperature values. In one or more embodiments, the summing module 222 communicates instructions to each of the filters 220a-d to indicate a timing that each of the filters 220a-d should provide temperature values associated with one another to enable the summing module 222 to determine a temperature value that accurately reflects a system temperature for a corresponding time period (e.g., over a combined operating window).

As noted above, the summing module 222 can compile values received from the filters 220a-d and determine a system temperature based on a combination of self-heating effects and crosstalk effects. In one or more embodiments, the summing module 222 applies a thermal model to the received values trained to determine a system temperature for a corresponding window of time. For example, the summing module 222 may compute temperature values in increments of one window at a time. In one or more embodiments, the thermal model includes one or more algorithms for considering factors such as a determined temperature value, a number of laser devices 208a-d, and any other characteristics or specifications associated with the respective laser devices 208a-d. In one or more embodiments, the thermal model includes one or more machine learning models trained to determine the system temperature based on some or all of the same factors and device characteristics.

Upon determining the system temperature, the summing module 222 can provide system temperature data to the laser driving circuit(s) 206 (and any other components within an associated computing device) for use in driving the laser devices 208a-d. For example, in one or more embodiments, the laser driving circuit(s) 206 will determine and provide updated instructions to one or more of the laser devices 208a-d to instruct the laser devices 208a-d to drive an energy stream at higher or lower current level based an effect of the system temperature on the laser devices 208a-d. For example, the system temperature (e.g., a higher or rising system temperature) may cause the laser devices 208a-d to drive the lasers at a lower intensity notwithstanding a similar current being used to drive the laser devices 208a-d for a previous window of time. To counteract this, the laser driving circuit(s) 206 can modify currents driving each of the laser devices 208a-d to ensure that an image displayed remains at a high (or at least the same) quality over time rather than deteriorating as temperature of the laser display system 202 changes.

Figure 4:
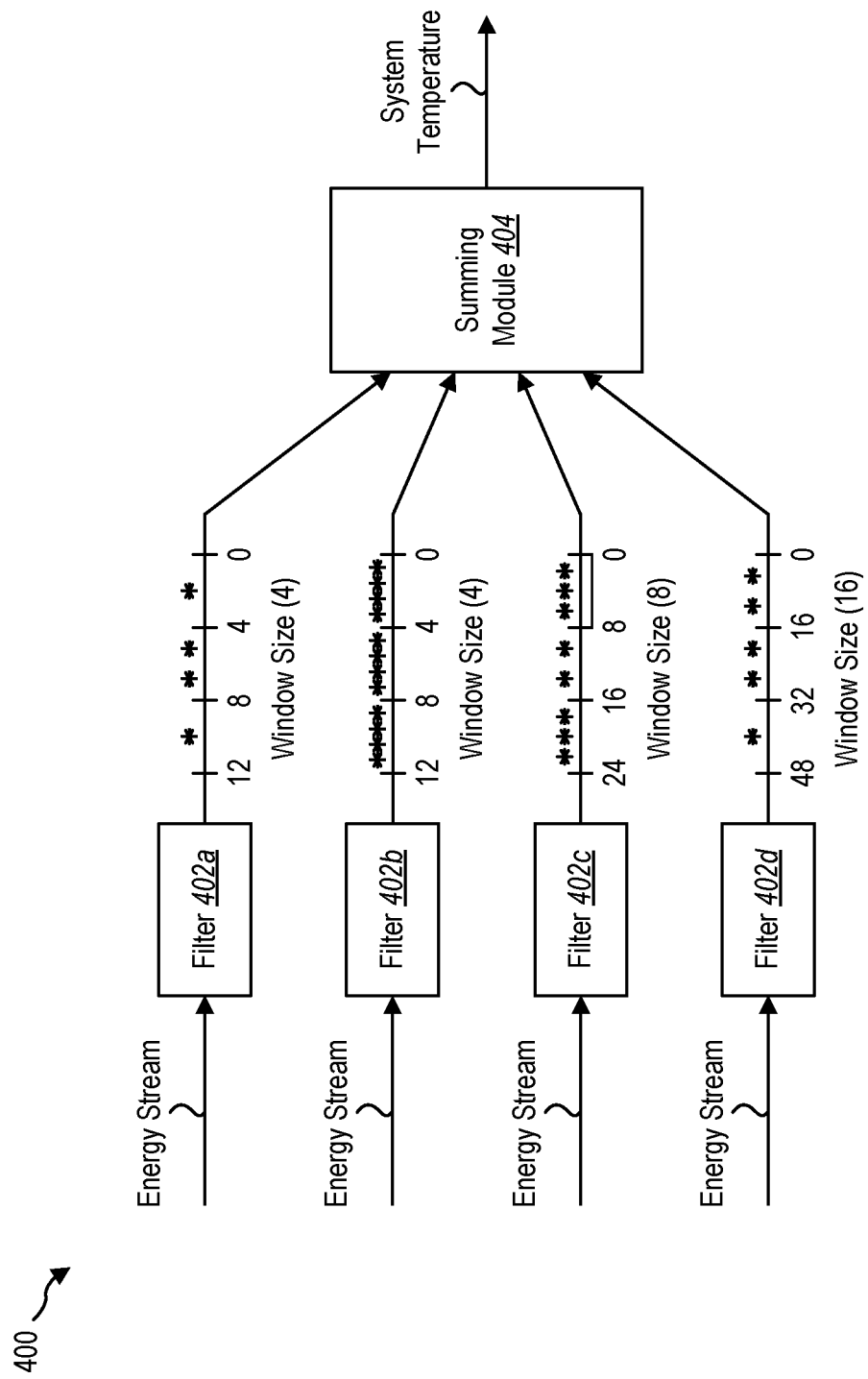
FIG. 4 illustrates an example workflow showing a first example implementation in which the laser display system models thermal effects for a plurality of laser devices.
Figure 5:
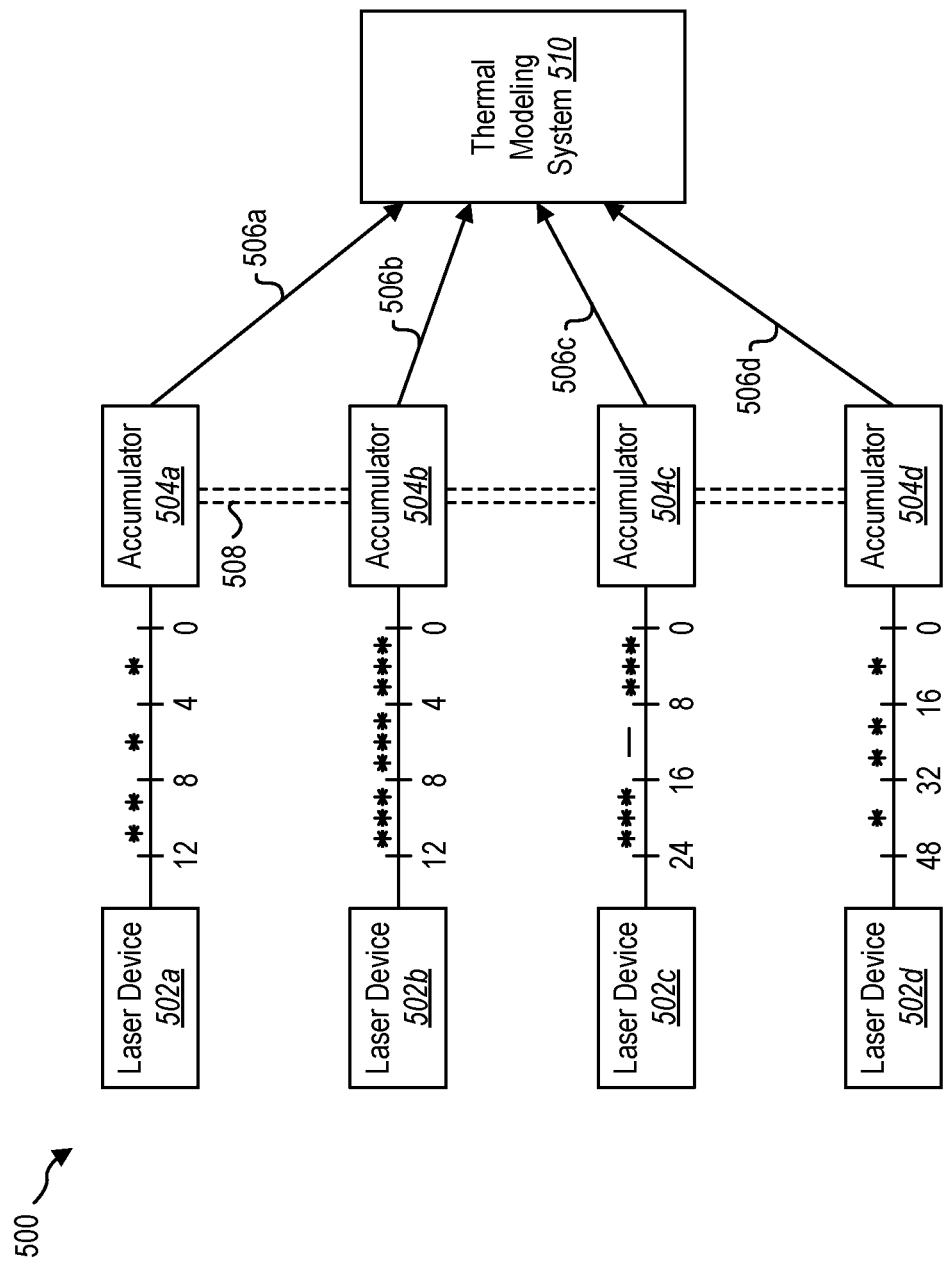
FIG. 5 illustrates an example workflow showing a second example implementation in which the laser display system models thermal effects for a plurality of laser devices.

Additional information will now be discussed in connection with different example implementations of the laser display system 202 in accordance with one or more embodiments. For example, FIG. 4 illustrates a first example implementation in which a summing module 222 is used to perform various features related to synchronizing temperature values prior to processing the values to determine a system temperature. Further, FIG. 5 illustrates a second example implementation in which control and synchronization logic 210 is used to perform various features related to synchronizing temperature values prior to processing and determining a system temperature. While FIGS. 4 and 5 are described as alternative embodiments, one or more features described in connection with FIG. 4 may similarly apply to FIG. 5 (and vice versa).

FIG. 4 shows an example workflow 400 showing an example set of filters 402 and a summing module 404 in accordance with one or more embodiments described herein. The filters 402a-d and summing module 404 may have similar features and refer to examples of the filters 220 and summing module 222 discussed above in connection with FIGS. 2-3. In addition, while FIG. 4 shows an example implementation including four filters 402a-d that receive and process streams of energy samples from respective laser devices, other implementations may include additional or fewer lasers than shown in FIG. 4.

As shown in FIG. 4, the filters 402a-d receive energy streams from respective laser devices. For example, a first filter 402a receives a first energy stream from a first laser device, a second filter 402b receives a second energy stream from a second laser device, a third filter 402c receives a third energy stream from a third laser device, and a fourth filter 402d receives a fourth energy stream from a fourth laser device. In one or more embodiments, the filters 402a-d receive the energy streams directly from the laser devices. In one or more embodiments, the filters 402a-d receive the energy streams (or values determined based on the energy streams) via the control and synchronization logic 210 positioned between the laser devices and filters 402a-d.

As mentioned above, the filters 402a-d may be programmed or otherwise configured to process the respective energy streams in accordance with operating windows. For instance, in the illustrated example shown in FIG. 4, the first filter 402a may be associated with an operating window of four units (or simple "four"). The second filter 402b may similarly be configured to process data in accordance with an operating window of four. The third and fourth filters 402c-d may have associated operating windows of eight units (or simply "eight") and sixteen units (or simply "sixteen").

In one or more embodiments, the operating windows are programmed in accordance with a base factor (e.g., two, four). In this example, the base factor may refer to four based on four being a highest common factor between the plurality of operating windows. Accordingly, in this example, a base window may refer to a window of four based on four being a common factor of the four operating windows. Moreover, as will be discussed below, a combined window for the illustrated example may refer to a window of sixteen based on sixteen being a least common multiple of the operating windows.

In one or more embodiments, the filters 402a-d receive and process energy stream data in accordance with a schedule or timing independent from other filters. For example, the energy samples may be received asynchronously with operating windows from the different filters 402a-d not lining up with one another. Accordingly, without further instruction or knowledge of other operating window states, the filters 402a-d may not necessarily determine temperature values for corresponding laser devices for overlapping time intervals.

As mentioned above, the summing module 404 can provide features related to synchronizing values with common time windows across the filters 402a-d. For example, in one or more embodiments, the summing module 404 receives or otherwise obtains data about the respective operating windows for each of the filters 402a-d. In this way, the summing module 404 can have awareness of the respective operating windows having different window sizes and utilize the base window and combined window to compile temperature data for overlapping periods of time between the respective filters 402a-d.

In one or more embodiments, the summing module 404 compiles sets of laser temperature values receives from the filters 402a-d over a combined window. More specifically, in one or more embodiments, the summing module 404 can compile temperature values for one or more of the filters 402a-d over incremental window sizes to create a record of temperature values from each of the filters 402a-d. As will be discussed below, the summing module 404 may perform this collection of temperature values such that the values collected from the respective filters 402a-d are relevant to temperature values determined over similar periods of time for energy samples output from each of the laser devices.

In one or more embodiments, the summing module 404 interacts with each of the filters 402a-d to facilitate selectively communicating temperature values determined by the filters 402a-d in accordance with a particular timing interval. For example, as will be discussed in connection with one or more examples below, the summing module 404 can provide a signal to one or more of the filters 402a-d at each base window increment indicating an acknowledgement of the base window and a status of a combined window inclusive of the plurality of operating windows. This acknowledgement may serve as a signal to the filters 402a-d to hold onto determined values or, alternatively, provide the determined values to the summing module 404. In one or more embodiments, the summing module 404 reads or otherwise obtains a wait or ready indicator provided by the filters 402a-d indicating a status of the filters 402a-d related to whether energy samples have been received in connection with a particular window of time. These indicators may serve as a signal that enables the summing module to provide instructions of when the filters 402a-d should provide determined temperature values to the summing module 404.

In one or more embodiments, the summing module 404 checks the status of the filters 402a-d at base window time intervals to check the indicated status. In one or more embodiments, where the status for each of the filters 402a-d indicates that data has been received and processed by each of the filters 402a-d for a current combined window, the summing module 404 can instruct the filters to provide the data (e.g., by providing an acknowledgement signal). Alternatively, where the combined window has not yet passed or where one or more of the filters 402a-d have not indicated a ready status, the summing module 404 can instruct the filter(s) 402a-d to hold the data until the combined window has passed and each of the filters has flagged a ready status (e.g., a ready status indicating that data has been processed by each filter for the relevant operating windows).

As example implementation of how the summing module 404 might advance through and collect data from the respective filters is shown in Table 1 below.

TABLE 1

| Filter 1 | Wait4 | Ready4 | Ready4 | Wait8 | Ready8 | Wait12 | Ready12 | Wait16 | Ready16 |
|---|---|---|---|---|---|---|---|---|---|
| Filter 2 | Wait4 | Wait4 | Ready4 | Wait8 | Ready8 | Wait12 | Ready12 | Wait16 | Ready16 |
| Filter 3 | Wait8 | Wait8 | Wait8 | Ready8 | Ready8 | Wait16 | Ready16 | Ready16 | Ready16 |
| Filter 4 | Wait16 | Wait16 | Wait16 | Ready16 | Ready16 | Ready16 | Ready16 | Ready16 | Ready16 |
| Summing Module | Wait4 | Wait4 | Ack4 | Wait8 | Ack8 | Wait12 | Ack12 | Wait16 | Ack16 |

As shown in Table 1, the filters 402a-d can indicate a ready or wait state for a given operating window. For example, a status of "Wait4" (from first and second filters 402a-b) may indicate that the first and second filters 402a-b are still working on calculating or otherwise determining a temperature value and/or are still waiting for additional data for a corresponding operating window. In contrast, a status of "Ready4" may indicate that the relevant filters (e.g., first and second filters 402a-b) have received and processed data for a first operating window and that the summing module 404 can receive that data as soon as ready.

As further shown, the summing module 404 may provide an acknowledgement signal at the end of each relevant window (e.g., at the end of each base window) indicating that the filter(s) can receive and process additional data for a subsequent time interval. Accordingly, where first and second filters 402a-b have smaller operating windows, they may collect and hold onto temperature values for each of multiple base windows until receiving an acknowledgement for the combined window (e.g., "ACK16" signal). Receiving this acknowledge signal may indicate that each of the four filters 402a-d have received and processed data and that the data from each of the filters 402a-d should be provided to the summing module 404 for further processing.

As further shown in Table 1, it may occur where a particular filter (e.g., the fourth filter 402d) receives and processes data well before expiration of the relevant operating window or a combined window. In this case, the summing module 404 may instruct the filter (e.g., fourth filter 402d) to hold data for some period of time until the other filters (e.g., first, second, and third filters 402a-c) are ready. While this may cause one or more of the filters 402a-d to hold data for some period of time, the combined window will generally be small enough that functionality of the laser display system 202 may not be interrupted or held up in a significant way.

By checking each of the filters in this way and providing acknowledgement signal(s) to the filters 402a-d, the summing module 404 can facilitate receiving temperature values for an overlapping combined window in which the temperature data for the respective laser devices is relevant to one another. As a result, the summing module 404 can receive and process data relevant to the same time period and determine an accurate system temperature reflective of individual laser devices (e.g., self-heating) as well as crosstalk for the same time period (e.g., for the same combined window).

As noted above, FIG. 5 illustrates another example implementation of a workflow 500 showing additional detail in connection with control and synchronization logic that may be implemented within a laser display system 202 in accordance with one or more embodiments. For example, the workflow 500 of FIG. 5 may provide an alternative technique for synchronizing data based on energy samples output from the laser devices over operating windows (e.g., asynchronous operating windows). As mentioned above, however, one or more features of the control and synchronization logic may be performed in combination with one or more features of the summing module 404 described above in connection with FIG. 4.

As shown in FIG. 5, an example workflow 500 includes a plurality of laser devices 502a-d and a plurality of accumulators 504a-d that load or otherwise provide entries from a set of queues 506a-d to a thermal modeling system 510. As further shown, each of the accumulators 504a-d are connected via a system bus 508. Each of the laser devices 502a-d, accumulators 504a-d, queues 506a-d, system bus 508, and the thermal modeling system 510 may include some or all of the features and functionality as similar components discussed above in connection with other example implementations.

As shown in this illustrated example, workflow 500 may include a set of multiple laser device 502a-d. For example, a first laser device 502a may output a first energy stream, a second laser device 502b may output a second energy stream, a third laser device 502c may output a third energy stream, and a fourth laser device 502d may output a fourth energy stream. In one or more embodiments, the laser devices 502a-d may refer to scanning lasers within a computing device (e.g., a wearable display device).

As shown in FIG. 5, each of the energy streams may have different operating windows. In particular, each of the laser devices 502a-d may be configured to output energy samples in accordance with a programmed operating window having a corresponding window size. In the example shown in FIG. 5, a first energy stream may include an operating window of four, a second energy stream may include an operating window of four, a third energy stream may include an operating window of eight, and a fourth energy stream may include an operating window of sixteen. In one or more embodiments, the energy streams are pre-programmed to have operating windows of a base of two time units.

As shown in FIG. 5, the energy streams output from the laser devices 502a-d may have different densities of energy samples. For example, a second energy stream may have a higher density output of energy samples than a first energy stream. As another example, a fourth laser device 502d may output an energy stream having a much lower density than the energy streams output from the first three laser devices 502a-c. As shown in FIG. 5, and as will be discussed in further detail below, one or more of the operating windows may have zero energy samples or intermittent sets of energy samples, such as a second operating window from the third laser device 502c.

Each of the energy samples may be received at the plurality of accumulators 504a-d. The accumulators 504a-d may track or otherwise identify a quantity of energy samples for the operating windows. For example, a first accumulator 504a can add energy samples for each of the operating windows for the first energy stream. Other accumulators 504*b-c* can similarly add energy samples for each of the operating windows of the corresponding laser device 502*b-d*.

In one or more embodiments, the accumulators 504*a-d* track quantities of energy samples for base window increments that make up a combined window for the plurality of laser devices 502*a-d*. For instance, in the illustrated example shown, a base window may refer to a window of size four based on four being a greatest common factor of the operating windows for the laser devices 502*a-d*. In addition, a combined window may refer to a window having a size of sixteen based on sixteen being a lowest common multiple of the operating windows associated with the plurality of laser devices 502*a-d*.

In this example, each of the accumulators 504*a-d* may add a quantity of energy samples for a corresponding base window. For first and second laser devices 502*a-b*, this may involve adding energy samples for corresponding operating windows (e.g., where the operating windows have the same size as the base window). For the third and fourth laser devices 502*c-d*, this may involve subdividing the operating windows into base window increments and adding energy samples within the respective base windows.

As noted above, the accumulators 504*a-d* may be coupled to one another via a system bus 508. For example, in one or more embodiments, the accumulators 504*a-d* may broadcast a status of an operating window to one another to facilitate synchronization between the accumulators 504*a-d* in identifying quantities of energy samples for corresponding base windows and adding queue entries to the queues 506*a-d*. For example, the first and second accumulators 504*a-b* may broadcast an update at each increment of the base window to instruct the accumulators 504*a-d* to update a next queue entry.

Indeed, as shown in FIG. 5, each of the accumulators 504*a-d* can populate a corresponding queue (e.g., queues 506*a-d*) including values representative of energy sample quantities over corresponding operating windows. In particular, in one or more embodiments, the accumulators 504*a-d* populate queues 506*a-d* including sets of entries that indicate energy sample quantities for base window increments that collectively make up a combined window. As used herein, a queue may include a hardware storage element in a laser display system within which queue values may be populated or loaded into the queue by the accumulators.

In accordance with the example illustrated in FIG. 5, where the base window is four and a combined window is sixteen, each of the queues 506*a-d* may include four entries for each combined window where the entries include an indicated quantity of energy samples observed for the base window intervals over a length of sixteen time units. In this example, the first queue 506*a* may include four queue entries indicating quantities of energy samples for each of four operating windows. The second accumulator 504*b* can populate a second queue 506*b* having similar properties based on the second laser device 502*b* having an operating window that is the same size as the base window.

In the same example, the third accumulator 504*c* may populate a third queue 506*c* including entries corresponding to base windows. In this example, because the base window is half the size as a corresponding operating window, the resulting queue 506*c* may include four entries representative of quantities for two consecutive operating windows. Similarly, the fourth accumulator 504*d* may populate a fourth queue 506*d* including entries corresponding to base windows. In this example, because the base window is one fourth the size as a corresponding operating window, the resulting queue 506*d* may include four entries representative of sample quantities for a single operating window.

In each of the instances where the laser device is operating in accordance with an operating window that is larger than (e.g., a multiple of) the base window, the queue may include one or more values that indicate that zero energy samples have been received over a corresponding base window. For example, a queue for a larger operating window may include null or zero values indicating that no energy samples were observed over the corresponding base window. In one or more embodiments, where the energy stream includes multiple base windows for which no energy samples are identified, the queue may include a single value indicating a quantity of base windows or a number of queue entries that have a zero value. This may provide an alternative to populating each entry of a queue for each zero value.

As shown in FIG. 5, in one or more embodiments, a laser device may output no energy samples for a corresponding operating window. For example, in the illustrated example, a third energy stream may have an operating window with zero energy samples. In this example, the third accumulator 504*c* may populate each entry of the third queue 506*c* for the relevant operating window with a zero value. Alternatively, in one or more embodiments, the accumulator may populate a queue including a value indicating that each entry (or a corresponding number of entries) is zero.

In one or more embodiments, a laser device may be off or otherwise not output an energy stream for an extended period of time. In this instance, the accumulator may detect a period of prolonged non-use and provide an indication of zero over a particular quantity of base windows. For example, instead of having some number of zero values over an observed period of time, the accumulator may simply provide a single value and an indicated length of time to a filter. (e.g., the thermal modeling system 510). This single value can provide processing savings as well as cut down on a number of communications that need to be made over the system bus 508 between the accumulators 504*a-d*. Indeed, where a laser device does not output an energy sample over a prolonged period of time, other active accumulators may simply proceed in tracking energy samples and populating/loading queues without waiting for a status update from the non-active accumulator(s).

As further shown in FIG. 5, each of the accumulators 504*a-d* may provide the queues 506*a-d* to the thermal modeling system 510 for further processing. Indeed, similar to one or more embodiments described above, the accumulators 504*a-d* can provide the queues 506*a-d* to a set of filters for further processing and determining temperature values for the corresponding laser devices 502*a-d*. In accordance with other examples described herein, the filters can further provide the temperature values (e.g., based on the loaded queues) to a summing module for further processing and determining a system temperature.

In one or more of the above examples, timestamps may be used as a means for determining which and how many energy samples belong within respective time windows. For example, in one or more embodiments, the filters and/or summing module may communicate timing information (e.g., timestamps) to ensure that energy samples from similar time windows are associated with one another when modeling the system temperature. As another example, in one or more embodiments, the accumulators may communicate timing information with one another via the system bus to ensure that energy samples from similar time windows are associated with one another when populating respective queue entries.

Figure 6:
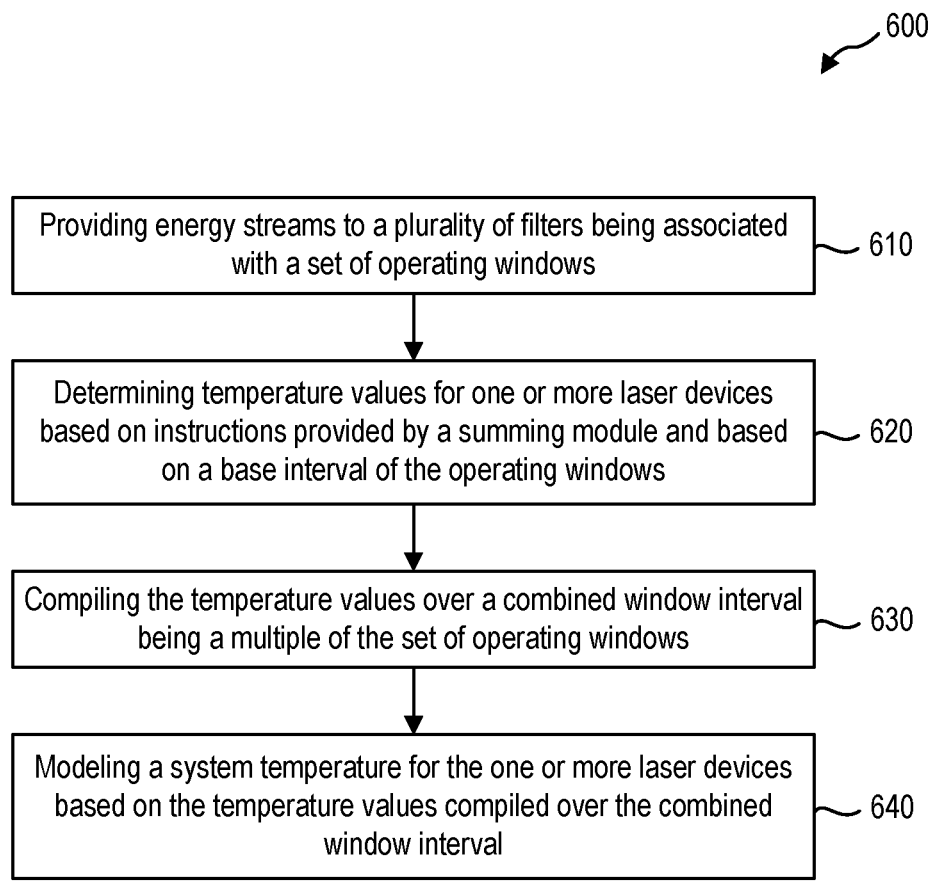
FIG. 6 illustrates a series of acts for modeling thermal effects for a laser system in accordance with one or more embodiments.
Figure 7:
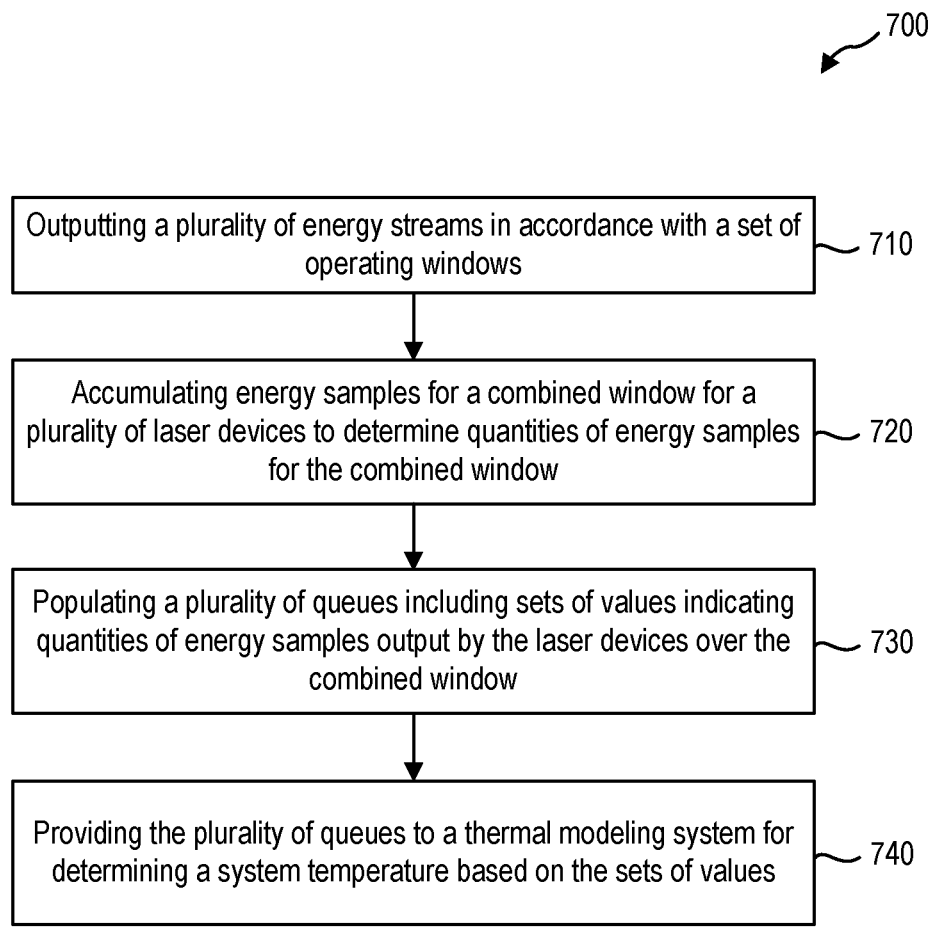
FIG. 7 illustrates another series of acts for modeling thermal effects for a laser system in accordance with one or more embodiments.

Turning now to FIGS. 6-7, these figures illustrate example flowcharts including series of acts for synchronizing energy sample data and/or temperature data for a set of laser devices for modeling thermal effects within a system. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

FIG. 6 illustrates a series of acts 600 for synchronizing energy sample and temperature data and modeling thermal effects within a laser display system. For example, as shown in FIG. 6, the series of acts 600 may include an act 610 of providing energy streams to a plurality of filters being associated with a set of operating windows. For example, in one or more embodiments, the act 610 may include providing, from a laser control system including a set of one or more laser devices, one or more energy streams to a plurality of filters, the plurality of filters being associated with a set of operating windows, wherein each operating window from the set of operating windows has a window size that is a multiple of a base window interval.

As further shown, the series of acts 600 may include an act 620 of determining temperature values for one or more laser devices based on instructions provided by a summing module and based on a base interval of operating windows. For example, in one or more embodiments, the act 620 includes determining, by the plurality of filters, temperature values for the set of one or more laser devices at base window intervals and providing the temperature values to a summing module based on instructions provided by the summing module.

As further shown, the series of acts 600 may include an act 630 of compiling the temperature values over a combined window interval being a multiple of the set of operating windows. For example, in one or more embodiments, the act 630 may include compiling, at the summing module, sets of laser temperature values received from the plurality of filters over a combined window interval, the combined window interval being a common multiple of window sizes for the set of operating windows.

As further shown, the series of acts 600 may include an act 640 of modeling a system temperature for the one or more laser devices based on the temperature values compiled over the combined window interval. For example. In one or more embodiments, the act 640 includes modeling a system temperature for the set of one or more laser devices based on the set of laser temperature values compiled over the combined window interval. In one or more embodiments, the summing module is configured to provide the system temperature as an input to a laser driving circuit where the laser driving circuit is configured to drive the one or more laser devices based at least in part on the system temperature.

In one or more embodiments, each filter from the plurality of filters is configured to determine a temperature value for a corresponding laser device asynchronously from other filters from the plurality of filters. Moreover, each filter from the plurality of filters may be configured to provide an indication of a ready state to the summing module upon determining a temperature value and receive an acknowledgement signal from the summer module indicating whether the filter should begin determining a temperature value for a next window. In one or more embodiments, the system temperature is based on a combination of self-heating effects of individual laser devices and crosstalk effects of multiple laser devices.

In one or more embodiments, the window sizes for the set of operating windows are programmed to have a common base factor. In one or more embodiments, the common base factor is determined to be the base window interval based on a smallest window size of the set of operating windows being equal to the base window interval.

In one or more embodiments, the set of one or more laser devices are implemented within a computing device that drives a display of a wearable head mounted display (HMD) device. Moreover, in one or more embodiments, the plurality of filters include infinite impulse response (IIR) filters.

FIG. 7 illustrates another example series of acts 700 related to synchronizing energy sample data for different operating windows and modeling a system temperature based on the energy sample data. As shown in FIG. 7, a series of acts 700 may include an act 710 of outputting a plurality of energy streams in accordance with a set of operating windows. For example, in one or more embodiments, the act 710 includes outputting, by a plurality of laser devices, a plurality of energy streams in accordance with a set of operating windows, wherein each operating window from the set of operating windows has a window size that is a multiple of a base window interval.

As further shown in FIG. 7, the series of acts 700 may include an act 720 of accumulating energy samples for a combined window for a plurality of laser devices to determine quantities of energy samples for the combined window. For example, in one or more embodiments, the act 720 includes accumulating, by a plurality of accumulators, energy samples for a combined window for the plurality of laser devices, wherein the combined window has an interval being a multiple of the set of operating windows, and wherein accumulating energy samples includes determining, for each laser device of the plurality of laser devices, a quantity of energy samples for the combined window.

As further shown in FIG. 7, the series of acts 700 may include an act 730 of populating a plurality of queues including sets of values indicating quantities of energy samples output by the laser devices over the combined window. For example, in one or more embodiments, the act 730 includes populating a plurality of queues, each queue of the plurality of queues including a set of one or more values indicating quantities of energy samples output by the plurality of laser devices over the combined window.

As further shown in FIG. 7, the series of acts 700 includes an act 740 of providing the plurality of queues to a thermal modeling system for determining a system temperature based on the sets of values. For example, in one or more embodiments, the act 740 includes providing the plurality of queues to a thermal modeling system for determining a system temperature associated with the plurality of laser devices for the combined window, wherein the system temperature is based on the set of one or more values from the plurality of queues.

In one or more embodiments, the thermal modeling system is configured to provide the system temperature as an input to a laser driving circuit. In one or more embodiments, the laser driving circuit is configured to drive the plurality of laser devices based at least in part on the system temperature. Further, in one or more embodiments, the plurality of accumulators are coupled via a control bus that facilitates communication between the plurality of accumulators, wherein each accumulator from the plurality of accumulators is configured to broadcast a current state of a respective queue from the plurality of queues to other accumulators via the control bus.

In one or more embodiments, the set of operating windows includes a first operating window having a first window size and a second operating window having a second window size, wherein the second window size is a multiple of the first window size, and wherein the first window size is the same size as the base window interval. In one or more embodiments, the plurality of accumulators includes a first accumulator configured to populate a first set of entries for a first queue having a number of entries based on a ratio of the combined window and the base window interval and a second accumulator configured to populate a second set of entries for a second queue having a same number of entries as the first queue. Further, in one or more embodiments, the second accumulator is configured to populate a zero value for one or more entries from the second set of entries for which an energy sample is not received within a given operating window associated with the second laser device.

In one or more embodiments, providing the plurality of queues to the summing module includes providing entries for each queue associated with a corresponding laser device to a filter for processing the values of the queue and determining temperature values for the plurality of laser devices. N one or more embodiments, the window sizes for the set of operating windows are programmed to have a common base factor, and wherein common base factor is determined to be the base window interval based on a smallest window size of the set of operating windows being equal to the base window interval.

In one or more embodiments, the system temperature is based on a combination of self-heating effects of individual laser devices and crosstalk effects of the plurality of laser devices. Further, in one or more embodiments, the plurality of laser devices are implemented within a computing device that drives a display of a wearable head mounted display (HMD) device. In one or more embodiments, the plurality of filters include infinite impulse response (IIR) filters.

Figure 8:
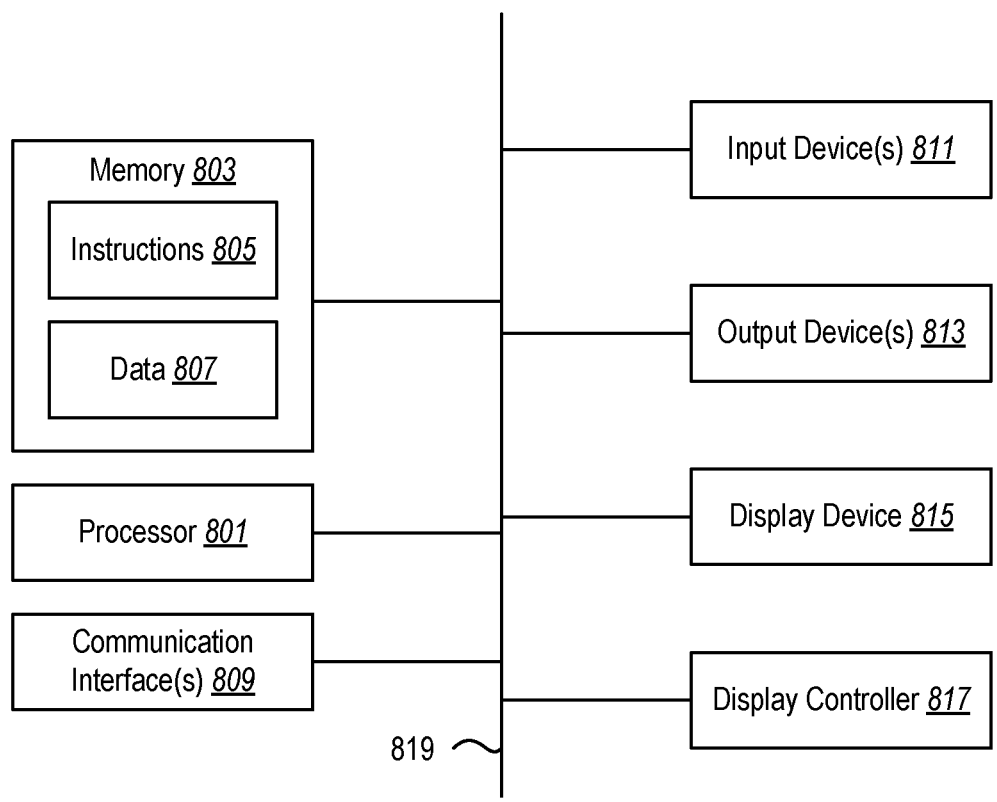
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 6, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 6 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method performed by a laser display system, comprising:
   providing, from a laser control system including a set of one or more laser devices, one or more energy streams to a plurality of filters, the plurality of filters being associated with a set of operating windows, wherein each operating window from the set of operating windows has a window size that is a multiple of a base window interval;
   determining, by the plurality of filters, temperature values for the set of one or more laser devices at base window intervals and providing the temperature values to a summing module, wherein the plurality of filters provide the temperature values to the summing module at a coordinated interval associated with the set of operating windows based on instructions provided by the summing module to the plurality of filters at the base window intervals;
   compiling, at the summing module, sets of laser temperature values received from the plurality of filters over the coordinated interval, the coordinated interval being a combined interval based on a common multiple of window sizes for the set of operating windows; and
   modeling a system temperature for the set of one or more laser devices based on the set of laser temperature values compiled over the coordinated interval.

2. The method of claim 1, the summing module further being configured to provide the system temperature as an input to a laser driving circuit, wherein the laser driving circuit is configured to drive the one or more laser devices based at least in part on the system temperature.

3. The method of claim 1, wherein each filter from the plurality of filters is configured to determine a temperature value for a corresponding laser device asynchronously from other filters from the plurality of filters.

4. The method of claim 3, wherein each filter from the plurality of filters is configured to:
   provide an indication of a ready state to the summing module upon determining a temperature value; and
   receive an acknowledgement signal from the summing module indicating whether the filter should begin determining a temperature value for a next window.

5. The method of claim 1, wherein window sizes for the set of operating windows are programmed to have a common base factor.

6. The method of claim 5, wherein the common base factor is determined to be the base window interval based on a smallest window size of the set of operating windows.

7. The method of claim 1, wherein the system temperature is based on a combination of self-heating effects of individual laser devices and crosstalk effects of multiple laser devices.

8. The method of claim 1, wherein the set of one or more laser devices are implemented within a computing device that drives a display of a wearable head mounted display (HMD) device.

9. The method of claim 1, wherein the plurality of filters include infinite impulse response (IIR) filters.

10. A method performed by a laser display system, the method comprising:
   outputting, by a plurality of laser devices, a plurality of energy streams in accordance with a set of operating windows, wherein each operating window from the set of operating windows has a window size that is a multiple of a base window interval;
   accumulating, by a plurality of accumulators, energy samples for a combined window for the plurality of laser devices, wherein the combined window has an interval being a multiple of the set of operating windows, and wherein accumulating energy samples includes determining, for each laser device of the plurality of laser devices, a quantity of energy samples for the combined window;
   populating a plurality of queues, each queue of the plurality of queues including a set of one or more values indicating quantities of energy samples output by the plurality of laser devices over the combined window; and
   providing the plurality of queues to a thermal modeling system for determining a system temperature associated with the plurality of laser devices for the combined window, wherein the system temperature is based on the set of one or more values from the plurality of queues.

11. The method of claim 10, wherein the thermal modeling system is configured to provide the system temperature as an input to a laser driving circuit, wherein the laser driving circuit is configured to drive the plurality of laser devices based at least in part on the system temperature.

12. The method of claim 10, wherein the plurality of accumulators are coupled via a control bus that facilitates communication between the plurality of accumulators, wherein each accumulator from the plurality of accumulators is configured to broadcast a current state of a respective queue from the plurality of queues to other accumulators via the control bus.

13. The method of claim 10, wherein the set of operating windows includes a first operating window having a first window size and a second operating window having a second window size, wherein the second window size is a multiple of the first window size, and wherein the first window size is the same size as the base window interval.

14. The method of claim 13, wherein the plurality of accumulators includes:
a first accumulator configured to populate a first set of entries for a first queue having a number of entries based on a ratio of the combined window and the base window interval; and
a second accumulator configured to populate a second set of entries for a second queue having a same number of entries as the first queue.

15. The method of claim 14, wherein the second accumulator is configured to populate a zero value for one or more entries from the second set of entries for which an energy sample is not received within a given operating window associated with the second accumulator.

16. The method of claim 10, wherein providing the plurality of queues to the thermal modeling system includes providing entries for each queue associated with a corresponding laser device to a filter for processing the values of the queue and determining temperature values for the plurality of laser devices.

17. The method of claim 10, wherein window sizes for the set of operating windows are programmed to have a common base factor, and wherein common base factor is determined to be the base window interval based on a smallest window size of the set of operating windows being equal to the base window interval.

18. The method of claim 10, wherein the system temperature is based on a combination of self-heating effects of individual laser devices and crosstalk effects of the plurality of laser devices.

19. The method of claim 10, wherein the plurality of laser devices are implemented within a computing device that drives a display of a wearable head mounted display (HMD) device.

20. A system, comprising:
one or more processors;
memory in electronic communication with the one or more processors; and
instructions stored in the memory, the instructions being executable by the one or more processors to cause a laser display system to:
output, by a plurality of laser devices, a plurality of energy streams in accordance with a set of operating windows, wherein each operating window from the set of operating windows has a window size that is a multiple of a base window interval;
accumulate, by a plurality of accumulators, energy samples for a combined window for the plurality of laser devices, wherein the combined window has an interval being a multiple of the set of operating windows, and wherein accumulating energy samples includes determining, for each laser device of the plurality of laser devices, a quantity of energy samples for the combined window;
populate a plurality of queues, each queue of the plurality of queues including a set of one or more values indicating quantities of energy samples output by the plurality of laser devices over the combined window; and
provide the plurality of queues to a thermal modeling system for determining a system temperature associated with the plurality of laser devices for the combined window, wherein the system temperature is based on the set of one or more values from the plurality of queues.

* * * * *